United States Patent [19]

Nisper

[11] 4,226,430
[45] Oct. 7, 1980

[54] TWO-PIECE OIL CONTROL RING

[75] Inventor: Kenneth J. Nisper, Muskegon, Mich.

[73] Assignee: Muskegon Piston Ring Company, Muskegon, Mich.

[21] Appl. No.: 966,768

[22] Filed: Dec. 5, 1978

[51] Int. Cl.³ .............................................. F16J 9/20
[52] U.S. Cl. .................................................... 277/139
[58] Field of Search ........................ 277/139, 140, 141

[56] References Cited

U.S. PATENT DOCUMENTS

| | | |
|---|---|---|
| 2,273,691 | 2/1942 | Bowers . |
| 2,591,190 | 4/1952 | Olson . |
| 2,635,022 | 4/1953 | Shirk . |
| 2,859,079 | 11/1958 | Olson . |
| 3,081,100 | 3/1963 | Nisper . |
| 3,124,364 | 3/1964 | Burns et al. . |
| 3,191,947 | 6/1965 | Hamm ................................. 277/139 |
| 3,191,948 | 6/1965 | Hamm ................................. 277/139 |
| 3,371,938 | 3/1968 | Hamm et al. . |
| 3,442,519 | 5/1969 | Hamm et al. . |
| 3,628,800 | 5/1971 | Prasse . |
| 3,741,569 | 6/1973 | Mayhew . |
| 4,053,164 | 10/1977 | Saylor . |

*Primary Examiner*—Robert I. Smith
*Attorney, Agent, or Firm*—Price, Heneveld, Huizenga & Cooper

[57] ABSTRACT

A two-piece oil control ring including a parted or split rail ring and a spacer-expander is disclosed. The spacer-expander includes a plurality of circumferentially spaced, cylinder wall engaging segments. Pairs of the segments are alternately interconnected by a generally vertical spring element and the remaining segments are interconnected by box sections. The spring elements are each bifurcated and further include reverse bent humps and a top rail stop. Each box section includes a first, bifurcated, generally vertical leg extending axially from the bottom inner radial edge of the ring, a second, slotless horizontal portion which defines a rail seat and a third, generally vertical pressure leg portion.

11 Claims, 4 Drawing Figures

U.S. Patent  Oct. 7, 1980  4,226,430
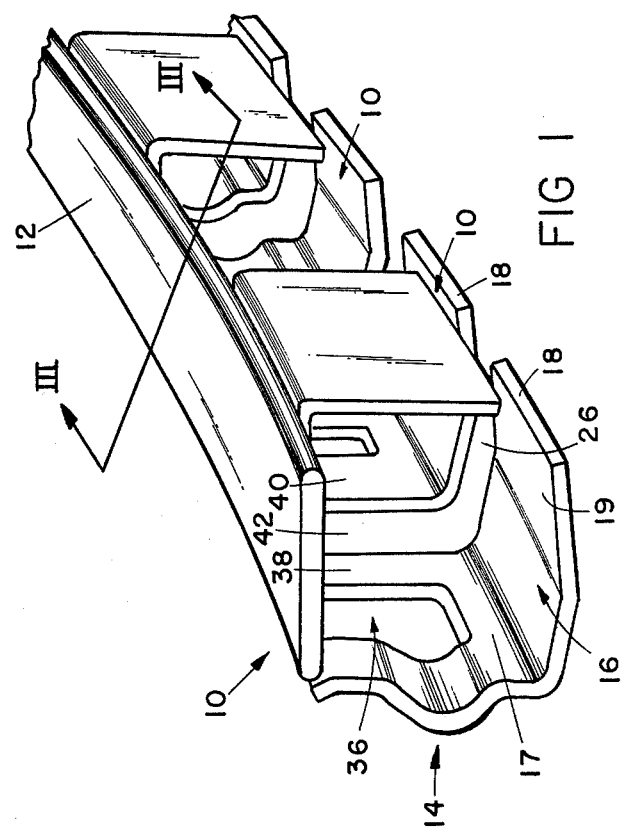
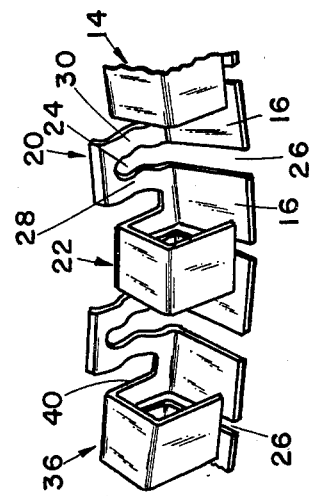
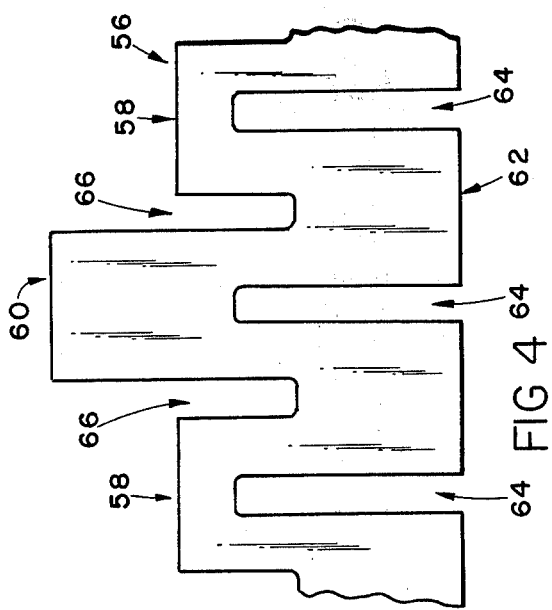
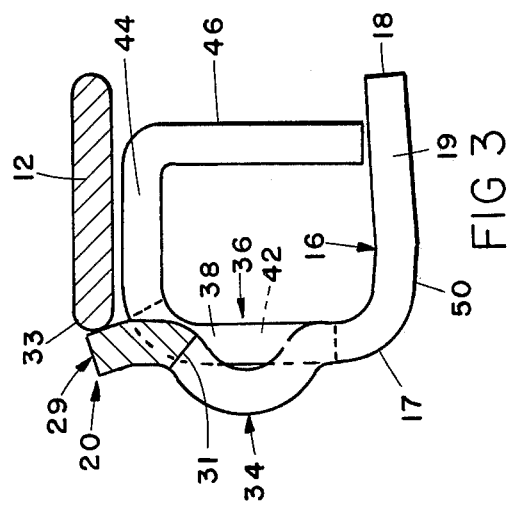

TWO-PIECE OIL CONTROL RING

BACKGROUND OF THE INVENTION

The present invention relates to oil control rings and more particularly two-piece oil control rings which include a spacer-expander having an integral bottom segmented rail and a split or parted top rail ring.

Oil control rings are used in internal combustion engines to limit the flow of lubricant along the cylinder wall and into the combustion chamber. Excess amounts of lubricant are distributed onto the cylinder wall of the internal combustion engine during operation to lubricate the pistons and cylinder wall, clean the cylinder wall, cool the cylinder wall and pistons and to increase the effectiveness of the seal between the piston rings and the cylinder wall. Oil control rings are necessary for oil economy purposes, to control exhaust emissions and for proper engine operation.

Heretofore a wide variety of piston ring configurations have been proposed for such oil control purposes. These various proposals have included one-piece, two-piece, and three-piece configurations. Each of these configurations typically includes an upper rail structure and an axially spaced lower rail structure which engages the cylinder wall. One-piece oil control rings include a non-parted top rail and either non-parted, or segmented lower rail defining segments. Three-piece oil control rings include split or parted top and bottom rails and a spacer-expander which axially spaces the rails and biases them radially outwardly into engagement with the cylinder wall. Typically, the spacer-expander exerts the same radial force to tension on the top and bottom rails. It has been found, however, that the upper rail performs the majority of the oil control function. The split or parted rails are fairly rigid or non-flexible due to their annular configuration. The radial stiffness limits the ability of the split rail to conform to variations in the cylinder wall's surface.

In an attempt to increase the effectiveness of an oil control ring, reduce the weight and hence the inertia and to increase the flexibility and hence the ability of the ring to conform the cylinder wall variations, two-piece oil control rings have been proposed. The two-piece oil control rings typically employ a top, parted or split rail and a spacer-expander having integral therewith a plurality of circumferentially spaced segments. The segments define a segmented bottom rail which is more flexible than the split rail ring and hence more easily conforms to cylinder wall variations. Further, the segments reduce the overall weight of the oil control ring thereby reducing the inertia of the ring. Typically, however, the segmented spacer-expander due to its flexibility requires a latch to join the abutting ends for assembly purposes. Further, prior two-piece oil control rings have not been readily adaptable to varying ring groove depths. Typically, the overall radial depth of the ring and the radial depth of the split rail ring have been increased to adapt the ring to an increased groove depth. Increasing the radial depth of the split rail ring, of course, increases its radial stiffness and hence reduces its ability to conform to variations in the cylinder wall. Further, most prior two-piece oil control rings have been designed to achieve an equal spring rate or force on the top split rail and the bottom segmented rails.

An example of one such prior two-piece oil control ring may be found in U.S. Pat. No. 3,191,947, entitled PISTON RING, and issued on June 29, 1965, to Hamm.

In one embodiment, the ring includes a spacer-expander having integral therewith a plurality of segments which define a bottom rail ring. The segments are alternately connected by generally vertically extending legs which are joined by a rail stop and define spring elements. The spring elements define axially extending slots which are continuous with radially extending slots defined by adjacent segments. The spring elements circumferentially alternate with a slotted leg which is bent into a box shaped in axial section. A slot defined by the leg extends axially at the inner face of the ring, radially across a horizontal portion of the leg and axially at the outer face of the ring. The spacer-expander is fabricated from a blank having alternating legs or loops of different transverse dimension. The longer loops define the box sections and the shorter loops are bent to define the spring elements.

Examples of other one-piece, two-piece and three-piece oil control rings may be found in U.S. Pat. No. 2,273,691, entitled OFFSET PISTON RING CONSTRUCTION, and issued Feb. 17, 1942, to Bowers; U.S. Pat. No. 2,635,022, entitled PISTON RING ASSEMBLY, and issued on Apr. 14, 1953, to Shirk; U.S. Pat. No. 2,859,079, entitled TRIPLE SEAL PISTON RING, and issued on Nov. 4, 1958, to Olson. U.S. Pat. No. 3,081,100, entitled PISTON RINGS, and issued on Mar. 12, 1963, to the present inventor; U.S. Pat. No. 3,124,364, entitled PISTON RING ASSEMBLY, and issued on Mar. 10, 1964, to Burns et al; U.S. Pat. No. 3,191,948, entitled PISTON RING, and issued on June 29, 1965, to Hamm; U.S. Pat. No. 3,371,938, entitled PISTON RINGS, and issued on Mar. 5, 1968, to Hamm et al; U.S. Pat. No. 3,442,519, entitled MONORAIL PISTON RING, and issued on May 6, 1969, to Hamm et al; U.S. Pat. No. 3,741,569, entitled OIL CONTROL PISTON RING, and issued on June 26, 1973, to Mayhew; and U.S. Pat. No. 4,053,164, entitled SPACER-EXPANDER FOR A PISTON OIL CONTROL RING, and issued on Oct. 11, 1977, to Saylor.

SUMMARY OF THE INVENTION

In accordance with the present invention, a two-piece oil control ring including a spacer-expander is provided whereby the radial tension exerted on a top rail is greater than the radial tension exerted on a plurality of bottom segments and the rigidity of the spacer-expander or the radial stiffness thereof is such that a latch is not necessary for assembly. Essentially, the spacer-expander includes a plurality of circumferentially spaced, generally horizontal, bottom segments, a plurality of spring elements alternately connecting adjacent pairs of segments and a plurality of box sections connecting the remaining pairs of adjacent segments.

In narrower aspects of the invention, each spring element includes a generally vertically disposed bifurcated leg having a slot opening axially through the bottom side of the oil control ring. The leg includes a circumferentially extending reverse bend or hump. Each of the box sections includes a vertical, bifurcated leg on the inner face of the ring, a second horizontal leg defining a rail seat and a third, vertical leg extending axially downwardly. The first leg is slotted and the second and third legs of the box section are slotless or solid.

BRIEF DESCRIPTION OF THE DRAWINGS

FIG. 1 is a fragmentary, perspective view of a two-piece oil control ring in accordance with the present invention;

FIG. 2 is a fragmentary, front perspective view of a spacer-expander in accordance with the present invention;

FIG. 3 is an axial view in section taken generally along line II—II of FIG. 1; and FIG. 4 is a fragmentary, plan view of a blank from which the spacer-expander is shaped.

DETAILED DESCRIPTION OF THE PREFERRED EMBODIMENT

A preferred embodiment of the unique two-piece oil control ring in accordance with the present invention is illustrated in FIG. 1 and generally designated 10. The ring 10 includes a top, parted or slit rail ring 12 and a spacer-expander 14. The spacer-expander is integral with a plurality of segments 16. Each segment 16 is generally L-shaped in axial section and includes a short axial leg 17 and a long, generally horizontal leg 19 which extends radially outwardly. Leg 19 defines a scraper edge 18 adapted to engage a cylinder wall. As best seen in FIGS. 2 and 3, the spacer-expander 14 includes alternating spring elements 20 and alternating box-like in section members 22. Each spring element 20 extends axially of the radial inner, lower edge of the spacer-expander 14 or radial inner edge of a segment 16 and is bifurcated to define an axial slot 24. Axial slot 24 opens through the bottom side of the spacer-expander and is continuous with a slot 26 defined by adjacent segments 16. The spring elements 20, therefore, each include axially extending, paired legs 28, 30. Leg 28 is joined to one segment 16 and leg 30 is joined to the next adjacent segment 16.

Each of the spring elements 20 defines a rail stop 29. The rail stop 29 is a web which extends between and connects the legs 28, 30 at their axial top edges 31. As best seen in FIG. 3, the rail stop 29 extends radially inwardly and upwardly at the top side of the ring and the inner edge 33 of the rail 12 engages the outer, inclined surface 35 of the web 29. Web 29 is inclined radially inwardly and upwardly at an angle between ten and seventeen degrees from vertical.

As best seen in FIG. 3, each leg 28, 30 of the spring elements 20 includes a circumferential, radially inwardly extending or concave hump or reverse bend 34. The reverse bend 34 is generally U-shaped in axial section and symetrical about a horizontal or radial plane passing through a point spaced slightly above the longitudinal center line of the spacer-expander. Bend 34 extends radially inwardly from the strut axial leg 17 of segment 16. The reverse bend or hump 34 increases the flexibility of the spring element 20.

Each box section 22 includes a first, axially extending member 36 which extends in a plane generally vertical to the plane of the segment 16. Member 36 is bifurcated or slotted to define a pair of circumferentially spaced, axially extending legs 38, 40. A slot 42 defined by the legs 38, 40 opens through the bottom side of the ring and is continuous with slot 26 separating adjacent segments 16 which are connected by the member 36. Slot 42 extends along the entire axial dimension of member 36. The spring members 20 and the box sections 22, therefore, alternately interconnect adjacent pairs of segments 16.

The box sections 22 each further include a generally horizontal, radially outwardly extending, slotless or solid portion 44. Portions 44 define a segmented split rail seat which supports split rail ring 12. Extending axially downwardly in a generally vertical plane from the outer radial edge of portion 44 of each box section 22 are pressure legs 46. The pressure legs extend in a plane which is spaced radially inwardly from the vertical plane defined by the radial outer edges of the split rail 12 and the segments 16. The pressure leg 46 terminates at a point axially spaced above the scraper legs 16. Each pressure leg 46 supports the segments 16 to prevent excessive bending of the legs during installation of the piston in the cylinder bore and during engine operation. The slight gap between the termination of the pressure leg 46 and the segment 16 permits limited flexing of the segments during operation. Each pressure leg 46, as seen in FIG. 2, overlies a pair of adjacent segments 16.

The configuration of the box sections 22 including the slotted, first vertical portion and the solid or non-slotted second and third portions increases the radial stiffness of the ring to eliminate the need for a latch member for assembly. This, therefore, increases the ease of assembly and reduces the overall cost of the ring since the latch is dispensed with. The configuration of the box sections, the slots therein and the configuration of the spring elements, as shown, controls the radial tension exerted on the rail 12 and on segments 16. The radial tension is greater on the rail 12 than on the segments 16.

As best seen in FIG. 3, each segment 16 is arched downwardly or is concave in a downward axial direction so as to define a crown 50. The segment is angled upwardly on opposite radial sides of the crown 50 at an angle between three to five degrees. The crown, as described in U.S. Pat. No. 3,442,519, provides a line contact between the bottom segments and the bottom side of a ring groove to increase the effectiveness of the seal between the oil control ring and the piston ring groove. Further, the crown permits the spacer-expander to adapt to tolerance variations in the oil control ring.

The spacer-expander in accordance with the present invention is preferably fabricated from an elongated, blank 56, as seen in FIG. 4. The blank 56 is punched from an elongated ribbon of spring steel material of the type conventionally employed to fabricate the spacer-expanders. Blank 56 includes alternating rectangular legs 58, 60. The legs 58 are all of the same transverse dimension, and when the blank is bent, define the spring elements 20. The legs 60 are of greater transverse dimension than the legs 58, and when the blank is bent, define the box sections 22. Extending transversely of the blank from a lateral edge 62 thereof are a plurality of equally spaced, parallel, blind slots 64. The blind slots 64 are all of the same transverse dimension. Slots 64 extending into legs 58 define the legs 28, 30 of the spring elements 20 and the connecting web 29. The legs 58, 60 are separated by equally dimensioned blind slots 66 which extend transversely of the blank and parallel to each other. The material of the blank between the slots 64 defines the scraper segments 16 after the blank is deformed along suitable bend lines into the configuration of the spacer-expander.

Variations in the transverse dimensions of the legs 58, 60 and in the bending of the blank to form the spring elements and the box sections adapts the spacer-expander to ring grooves of different depths and to rail rings of different radial widths. The ring groove depth adaptability is achieved by varying the radius of the hump 34 which in turn varies the overall radial width or depth of the ring. A greater radius adapts the ring to deeper ring grooves. Variation of the bend lines when bending the legs 58 to form the spring elements adapts for the radial depth or wall of the parted ring.

The oil control ring in accordance with the present invention is easily manufactured employing conventional punching and forming techniques. For example, the blank may be formed into the desired configuration with forming dies. The spacer-expander possesses sufficient radial stiffness due to the configuration of the box sections so that a latch is not necessary for assembly. Further, a greater radial tension is exerted on the top rail ring and hence the top rail ring exerts a higher unit pressure against a cylinder wall than the segments 16. The difference in radial tension is achieved by the formation of the slots 64, 66 in the blank and their location in the completed spacer-expander. This reduces cylinder wall wear and oil control ring wear while maintaining oil economy. As previously stated, the majority of the oil control efficiency of an oil control ring is obtained by the top rail. Due to the configuration of the spacer-expander, the radial depth of the top rail may be controlled to obtain optimum flexibility and hence conformance with the cylinder wall. The lower segments provide a counter rotating coupling to limit twisting of the ring in a piston groove and to stabilize the ring position during engine operation. The lower segments 16 which are alternately interconnected by the paired legs 28, 30 and 38, 40 have sufficient, independent flexibility to rapidly and effectively conform to variations in the cylinder wall during engine operation. Also, the ring has a fairly high degree of openness to permit efficient return of the lubricant removed from the wall surface without danger of clogging.

In view of the foregoing description, those of ordinary skill in the art will undoubtedly envision various modifications to the oil control ring in accordance with the present invention. Therefore, the above description should be considered as that of the preferred embodiment. The true spirit and scope of the present invention may be determined by reference to the appended claims.

The embodiments of the invention in which an exclusive property or privilege is claimed are defined as follows:

1. A spacer-expander adapted for use with a parted rail ring and including an integral cylinder wall engaging lower rail, comprising:
   a plurality of circumferentially spaced segments defining said lower rail;
   a plurality of circumferentially spaced legs, said legs being divided into pairs with one leg of each pair extending axially from one segment and the other leg of the pair extending axially from the next adjacent segment;
   a plurality of webs, each web interconnecting the legs at their axial top edges and defining therewith a plurality of spring members; and
   a plurality of L-shaped in section members interconnecting the legs of the remaining pairs of legs, said members each including a solid radially outwardly extending portion defining a rail seat adapted to support the parted rail ring and a solid axially and downwardly extending portion defining a pressure leg terminating in closely spaced relationship and axially above a pair of adjacent segments and dimensioned to permit limited flexing of said segments, whereby the radial tension exerted on the rail ring is greater than the radial tension exerted on the spaced segments defining the lower rail.

2. A spacer-expander as defined by claim 1 wherein each of said legs of said spring elements defines a reversely bent portion opening radially outwardly, variation of the radius of said reversely bent portion adapting said spacer-expander to different groove depths.

3. A spacer-expander as defined by claim 2 wherein each segment is arched downwardly to define a circumferentially extending crown.

4. A spacer-expander as defined by claim 3 wherein each web of said spring elements is bent radially inwardly and upwardly and defines a top rail stop.

5. A spacer-expander for a two-piece oil control ring, comprising:
   a plurality of circumferentially spaced generally horizontal segments defining a segmented lower rail ring;
   a plurality of spring elements interconnecting alternate pairs of said segments, each of said spring elements including a pair of circumferentially spaced legs extending axially upwardly from the radial inner edge of said segments, defining an axially extending slot, and being joined by a web which defines a rail stop; and
   a plurality of box-like in axial section members interconnecting the remaining pairs of said segments, each of said members including a bifurcated portion at the inner face of said spacer-expander, a solid, slot free horizontal portion axially spaced above said segments and defining a slotless rail seat, and an axially downwardly extending, solid, slotless pressure leg at the outer face of said spacer-expander, whereby the spacer-expander exerts a greater radial tension on a top rail ring disposed on the rail seat than is exerted on the horizontal segments.

6. A spacer-expander for a two-piece oil control ring as defined by claim 5 wherein the legs of each of said spring elements are curved radially inwardly and then outwardly to define a generally U-shaped concave portion.

7. A spacer-expander for a two-piece oil control ring as defined by claim 6 wherein each of said segments is generally L-shaped in axial section including a short axially extending portion at the inner face of said spacer-expander and a radially extending generally horizontal portion.

8. A spacer-expander for a two-piece oil control ring as defined by claim 7 wherein said U-shaped portion of each leg of said spring elements curves radially inwardly from said short axially extending portion of a segment.

9. A two-piece oil control ring comprising:
   a parted rail ring; and
   a spacer-expander supporting said rail on a rail seat and exerting a radial force on said rail, said spacer-expander including a plurality of circumferentially spaced segments, a plurality of spring elements alternately connecting adjacent pairs of segments and a plurality of box sections connecting the remaining pairs of adjacent segments, said spring elements each including a generally vertically disposed bifurcated leg, said leg having a slot opening axially through the bottom side of the oil control ring and said leg having a circumferentially extending hump, said box sections each including a first vertical leg on the inner face of said ring, a second horizontal leg defining a rail seat and a third vertical leg extending axially downwardly, said first leg defining a slot and said second and third legs being slotless, whereby a greater radial tension is exerted on the parted rail ring than on the spaced segments.

10. A two-piece oil control ring as defined by claim 9 wherein said spring elements each include a radially inwardly and upwardly inclined rail stop.

11. A two-piece oil control ring as defined by claim 10 wherein said circumferential humps are symetrical about a horizontal plane passing through a point offset axially above the circumferential center line of said oil control ring.

* * * * *